UNITED STATES PATENT OFFICE.

SIDNEY F. SHELBOURNE, OF NEW YORK, N. Y.

INSULATING COMPOUND FOR ELECTRIC CONDUCTORS.

SPECIFICATION forming part of Letters Patent No. 275,422, dated April 10, 1883.

Application filed September 19, 1882. (Specimens.)

*To all whom it may concern:*

Be it known that I, SIDNEY F. SHELBOURNE, a citizen of the United States, residing in the city of New York, in the State of New York, have invented a new and useful composition of matter to be used for insulating wires or metals from each other and from contiguous substances in the business of telegraphic and telephonic communication or of lighting by electricity; and I do hereby declare that the following is a full, clear, and exact description of my invention, which will enable others skilled in the art to which it appertains to make, compound, and use the same.

My invention relates to a useful combination of certain of the materials in that class of substances known as "non-conductors of electricity," or "insulators in electrical transmission."

It is well known that for the insulating of wires in submarine and underground cables gutta-percha has been hitherto chiefly used, and for other situations—within buildings or through the air upon poles—glass, hard rubber, or a coating of cotton saturated with paraffine have been found most useful. While paraffine is considered to be the best insulator of electricity known among tangible substances, yet by itself, in its first and cheapest condition of production, it is very friable, has no tensibility, and easily admits of fracture if molded into any particular form. Even in its refined and most expensive condition it retains largely the qualities just named. In experimenting with this substance, and tracing the history of its production and that of its homologues, I have discovered among the hitherto waste products of the distillation of petroleum a substance of high insulating qualities, but quite unknown among dealers in the products of such distillation. This substance, for want of a more appropriate name, has been known by the workmen at the stills as "tailings," and has been used, in most part, as fuel for the furnaces of the refineries. I have ventured to call it "petrapitta," the significance of which name will be readily understood by those familiar with the usual sources of nomenclature. When combined with paraffine in proper proportions it gives a composition which is both tensible and moderately flexible, as well as tough and non-friable. It is the only product of petroleum which is heavier than water, and is to be classed among the hydrocarbon homologues. Concentrated nitric or muriatic acids will not touch it, strong sulphuric acid merely burns a film of its surface brown, and it is not affected by the other minor acids known to commerce, neither will alkalies dissolve or unite with it. Benzone is merely discolored by its presence when cold; but it is freely dissolved by chloroform. This substance first appears toward the end of the "tar" distillation of the petroleum refineries. When the illuminating-oil passing over from the stills has descended to a specific gravity of about 39° to 35° Baumé, the residuum remaining in stills has reached a gravity of 20° to 17° Baumé, and is called "petroleum-tar," and being removed to stronger stills and subjected to greater heat the distillation is continued, and the oils passing over and condensing are then called "paraffine-oils." The ultimate residuum is a coke or carbon solid mass containing all the non-volatile substances of the original fluid and those which may have been produced by any partially-destructive distillation in the progress of the reduction. The tailings or petrapitta pass over with the oil, and when first produced constitute, upon cooling, a thick, viscid, tough, and tensible product, very sticky and slightly odorous. The name "tailings" was doubtless given to this product because, being heavier than water, it tailed or fell down in stringy droppings from the lower edges of the outlets or termination of the condensing-pipes, while the oil, being lighter and more fluid, flowed in streams over and beyond it. Near the close of the distillation the tailings or petrapitta begins to assume a firmer and less fluid consistency, and when cold constitutes a hard and resinous appearing substance of a dull fracture and a reddish-yellow color.

Having thus fully and particularly described and designated the principal substance by which the useful properties of the composition the subject of my invention consist and are determined, I now proceed to describe the manner of the composition and the proportions to be used.

The petrapitta usually contains some particles of moisture mechanically held in its substance, due to accidental causes in its production. It is therefore desirable to first place it over a fire in a caldron by itself, so as thoroughly to expel all the moisture. When this is done the unrefined paraffine is to be added in the proportion of one pound of paraffine to two pounds of petrapitta to produce the best result if the latter is of the hard variety; but the proportions may be varied within certain limits, even from one to three pounds of the petrapitta to one of the paraffine and still give a valuable modification of the qualities of the paraffine as it exists alone. If the petrapitta should be of the softer condition, its quality of stickiness and easy flexibility when combined with the paraffine in the proportion of two parts of the former to one of the latter should be modified by other non-conducting substances to produce the results already explained for the hard and resinous condition of the petrapitta. For this purpose I obtain the best results by first melting with the petrapitta equal parts, by weight, of the hardest variety of Carolina rosin, and then adding one pound of paraffine to two pounds of the combined substances, as before proportioned, for the hard petrapitta. With the soft condition of the petrapitta, as with the hard, the resultant composition may be varied within considerable limits by varying the proportions of the rosin and paraffine, since the petrapitta may be more hard and solid, or the reverse, as it happens to be produced nearer the first part or the last part of the distillation. In melting the materials together, they should be thoroughly incorporated with each other and the composition made homogeneous by stirring, after which it may be poured into iron vessels or forms, rubbed on their molding-surfaces with a sponge containing glycerine to prevent the compound adhering to the molds. When cold the cakes or blocks of the composition may then be removed from the molds to be transported and used as required.

It will be seen that the application of this compound to its uses in insulating electric conductors can be made in a variety of ways. The principal method now contemplated in my invention is by pouring it, when melted, around and between the wires when formed, with proper separating-spaces, into cables and as such cables suspended longitudinally in the center of matching-molds, the sections of which, when united, may form the inclosure for a considerable length of the cable, and the wires become insulated for many feet of their length at a single pouring. This method is designed to be used when constructing and insulating cables immediately over or within the trenches in which they are to be laid, as in systems of electric conduction for underground telegraphy.

It is to be observed that as the petrapitta described in the foregoing specification passes over at the same time with the last portions of the heavier oil some of that oil itself is found in intimate mixture with the petrapitta, and may be regarded, in the combinations to be formed, itself as a separate and determinable heavy distillate of the distillation of the residuum, and to be necessarily included, in variable proportions, as a constituent of the result presented.

I am aware that petrapitta or wax-tailings have been known and experimented with already for various purposes and uses, both by itself and in combination with the black and carboniferous residuum left in the stills at the end of the distillation, and therefore I do not claim to be the discoverer of it as a new substance, nor do I claim the combination of it with any quality of refuse or indefinite and variable black mass left in the stills at whatever point the distillation may be arrested; but I am not aware, and I do not believe, that this substance, or the accompanying heavy distillates, distinctly as such, passing over and condensed at the same time with it, have ever been used before to modify and improve the mechanical qualities of well known and used insulating substances—such as paraffine—the several resinous and similarly-frangible bituminous substances to produce definitely tensile and flexible compounds, which will not readily crack upon or about the wires so as to admit moisture and greatly diminish their insulation.

I am also aware that attempts have been made to oxidize the heavier distillates of petroleum by means of combinations with certain of the unusual acids, and also to combine with petroleum residuum and its constituent substances such absorbing and modifying materials as clay, pulp, or other vegetable fiber; but the results attained by these several manipulations are in no way identical with or similar to the composition I have produced as a result of the combinations I have described.

It is to be further observed that in all the several compositions produced as the result of the combination of the residuum of petroleum with other substances a variable amount of free carbon necessarily enters as one of the constituents determinable by the use of the residuum as to its nearness of reduction to the coky mass left in the stills as the ultimate remainder of the process of distillation. This carbon inevitably injures the insulating qualities of the compositions into which it enters, and it has been an object in my invention for such reason to avoid the residuum left in the stills; but on the contrary it will be seen that the heavier distillates which are vaporized, pass over, and are drawn from the condenser of the apparatus cannot contain any free carbon, because it is not vaporizable or gasefiable at any temperature less than that of combustion.

Having thus fully described my invention, what I desire to claim, and secure by Letters Patent of the United States, is—

1. An insulating compound for telegraph-wires and electric uses composed of paraffine, in combination with one or more of the heavier and separate distillates passing over in the redistillation of the residuum of petroleum, as set forth.

2. An insulating material for telegraph-wires and electric uses wherein the friable, frangible, and non-tensile qualities of paraffine and equivalent known resinous and bituminous insulating substances are modified by combining with them in variable proportions one or more of the heavier distillates of the residuum of petroleum, so as to produce a composition homogeneous in itself and moderately tensile and flexible when cold at ordinary temperatures, as described.

3. The means herein described of producing a cheap and largely useful insulating material for telegraph-wires and electric purposes in the process of imparting to paraffine greater tensile and flexible qualities through the combination with it, in varying proportions, of one or more of the heavier distillates of the residuum of petroleum, as set forth.

4. The process herein described of treating the substance called "petrapitta" by first subjecting it to prolonged heat at temperatures above the boiling-point of water to expel its volatile vapors and then combining it with paraffine and other known equivalent frangible insulating substances in producing a tensile and flexible insulating composition for electrical purposes, as set forth.

5. As a new and useful article of manufacture, an insulating composition for electrical purposes produced in the combination of known frangible or friable resinous insulating substances with one or more of the softening and sticky products passing over in the redistillation of the residuum of petroleum, as described.

SIDNEY F. SHELBOURNE.

Witnesses:
GEO. M. RILEY,
CHAS. RILEY.